(12) United States Patent
Okada et al.

(10) Patent No.: US 10,848,471 B2
(45) Date of Patent: Nov. 24, 2020

(54) COMMUNICATION APPARATUS, COMMUNICATION METHOD, AND PROGRAM

(71) Applicant: NTT Communications Corporation, Chiyoda-ku (JP)

(72) Inventors: Atsushi Okada, Minato-ku (JP); Atsuo Shimizu, Setagaya-ku (JP)

(73) Assignee: NTT Communications Corporation, Chiyoda-ku (JP)

( * ) Notice: Subject to any disclaimer, the term of this patent is extended or adjusted under 35 U.S.C. 154(b) by 0 days.

(21) Appl. No.: 16/345,042

(22) PCT Filed: Jan. 31, 2018

(86) PCT No.: PCT/JP2018/003289
§ 371 (c)(1),
(2) Date: Apr. 25, 2019

(87) PCT Pub. No.: WO2019/058574
PCT Pub. Date: Mar. 28, 2019

(65) Prior Publication Data
US 2019/0281033 A1 Sep. 12, 2019

(30) Foreign Application Priority Data
Sep. 25, 2017 (JP) .................. 2017-183990

(51) Int. Cl.
*H04L 29/06* (2006.01)
*H04L 9/14* (2006.01)
*H04L 9/08* (2006.01)

(52) U.S. Cl.
CPC ............ *H04L 63/062* (2013.01); *H04L 9/08* (2013.01); *H04L 9/14* (2013.01); *H04L 63/0414* (2013.01);
(Continued)

(58) Field of Classification Search
CPC . H04L 63/062; H04L 9/08; H04L 9/14; H04L 63/0414; H04L 63/0428; H04L 63/068; H04L 65/1006; H04L 65/1069
(Continued)

(56) References Cited

U.S. PATENT DOCUMENTS 6,857,072 B1 * 2/2005 Schuster ............ H04L 63/0428
380/277
7,325,133 B2 * 1/2008 Fascenda ............ H04L 63/083
380/270
(Continued)

FOREIGN PATENT DOCUMENTS

CN 101370004 A 2/2009
EP 2 136 504 A1 12/2009
(Continued)

OTHER PUBLICATIONS

International Search Report dated Apr. 10, 2018 in PCT/JP2018/003289 filed on Jan. 31, 2018.
(Continued)

*Primary Examiner* — Shahriar Zarrineh
(74) *Attorney, Agent, or Firm* — Oblon, McClelland, Maier & Neustadt, L.L.P.

(57) ABSTRACT

A communication apparatus for use in a communication system including a call control apparatus and a key information distribution apparatus is provided. The communication apparatus includes a key generation means configured to, when media communication is performed between the communication apparatus and another communication apparatus, request the key information distribution apparatus to provide common key generation information for generating a first common key, a call control means configured to establish a call connection between the communication apparatus and said another communication apparatus by transmitting a call connection request to the call control
(Continued)

apparatus, and a communication means configured to transmit and receive an encrypted media packet by using a second common key, wherein the key generation means generates the first common key by using the common key generation information received from the key information distribution apparatus, and after the first common key is generated, the communication means transmits and receives an encrypted media packet by using the first common key.

7 Claims, 9 Drawing Sheets

(52) U.S. Cl.
CPC ........ *H04L 63/0428* (2013.01); *H04L 63/068* (2013.01); *H04L 65/1006* (2013.01); *H04L 65/1069* (2013.01)

(58) Field of Classification Search
USPC .......................................................... 713/171
See application file for complete search history.

(56) References Cited

U.S. PATENT DOCUMENTS

| | | | | |
|---|---|---|---|---|
| 7,684,565 | B2* | 3/2010 | Medvinsky | H04L 63/0457 380/255 |
| 7,817,802 | B2* | 10/2010 | Kitaj | H04L 9/0822 380/281 |
| 8,316,237 | B1* | 11/2012 | Felsher | H04L 9/0825 380/282 |
| 8,462,942 | B2* | 6/2013 | Berggren | H04L 9/14 380/42 |
| 8,681,981 | B2* | 3/2014 | Bekiares | H04L 65/4061 380/255 |
| 8,881,305 | B2* | 11/2014 | Salomone | H04W 12/04031 726/29 |
| 2002/0083046 | A1 | 6/2002 | Yamauchi et al. | |
| 2002/0104025 | A1* | 8/2002 | Wrench, Jr. | H04L 9/3271 726/3 |
| 2003/0112977 | A1* | 6/2003 | Ray | H04L 9/321 380/270 |
| 2003/0131236 | A1* | 7/2003 | Sasmazel | H04L 63/0414 713/171 |
| 2004/0165729 | A1* | 8/2004 | Bisson | H04L 9/0825 380/281 |
| 2005/0215234 | A1* | 9/2005 | Fukuzawa | H04W 84/18 455/411 |
| 2006/0029050 | A1* | 2/2006 | Harris | H04M 1/2535 370/356 |
| 2006/0031910 | A1* | 2/2006 | Pulitzer | G06F 3/005 725/119 |
| 2006/0129629 | A1* | 6/2006 | Kawashima | G06Q 10/107 709/203 |
| 2007/0016775 | A1* | 1/2007 | Islam | H04L 63/08 713/168 |
| 2007/0022289 | A1* | 1/2007 | Alt | H04L 63/0272 713/168 |
| 2007/0171851 | A1* | 7/2007 | Beckmann | H04W 8/08 370/328 |
| 2007/0218924 | A1* | 9/2007 | Burman | H04L 29/06027 455/466 |
| 2008/0022383 | A1* | 1/2008 | Bobde | H04L 65/1006 726/10 |
| 2008/0144827 | A1* | 6/2008 | Davis | H04K 1/00 380/270 |
| 2010/0002880 | A1* | 1/2010 | Yoon | H04L 12/66 380/255 |
| 2010/0157990 | A1* | 6/2010 | Krzyzanowski | G06F 9/452 370/352 |
| 2010/0220850 | A1* | 9/2010 | Gisby | H04K 1/00 379/211.02 |
| 2011/0170689 | A1* | 7/2011 | Park | H04L 9/08 380/247 |
| 2012/0016996 | A1* | 1/2012 | Samavedam | H04L 65/1006 709/227 |
| 2012/0027210 | A1 | 2/2012 | Takeuchi et al. | |
| 2012/0045056 | A1 | 2/2012 | Takashima et al. | |
| 2012/0140908 | A1* | 6/2012 | Sana | H04L 65/4023 379/93.01 |
| 2012/0210134 | A1* | 8/2012 | Mitter | H04L 9/0825 713/171 |
| 2012/0284530 | A1 | 11/2012 | Takashima et al. | |
| 2013/0028415 | A1 | 1/2013 | Takashima et al. | |
| 2013/0039489 | A1 | 2/2013 | Takashima et al. | |
| 2014/0052986 | A1* | 2/2014 | Kanai | H04L 63/0428 713/168 |
| 2014/0247941 | A1* | 9/2014 | Gu | H04L 63/062 380/270 |
| 2015/0026473 | A1 | 1/2015 | Johnston et al. | |
| 2015/0193702 | A1* | 7/2015 | Grbavac | G06Q 10/02 705/51 |
| 2016/0344726 | A1* | 11/2016 | Stojanovski | H04W 76/10 |
| 2016/0352708 | A1* | 12/2016 | Fer | H04L 63/06 |
| 2017/0163694 | A1* | 6/2017 | Skuratovich | H04L 65/602 |
| 2017/0208045 | A1* | 7/2017 | Huh | H04L 9/3247 |
| 2017/0223529 | A1* | 8/2017 | Schafer | H04L 63/045 |
| 2017/0262837 | A1* | 9/2017 | Gosalia | G06Q 20/3255 |

FOREIGN PATENT DOCUMENTS

| | | |
|---|---|---|
| JP | 2002-305533 A | 10/2002 |
| JP | 2010-178242 A | 8/2010 |
| JP | 5253567 B2 | 7/2013 |
| JP | 5334873 B2 | 11/2013 |
| JP | 5349261 B2 | 11/2013 |
| JP | 5424974 B2 | 2/2014 |
| JP | 5612494 B2 | 10/2014 |
| JP | 5769401 B2 | 8/2015 |
| JP | 5852551 B2 | 2/2016 |
| JP | 5852594 B2 | 2/2016 |
| JP | 2016-134826 A | 7/2016 |
| JP | 2016-213543 A | 12/2016 |
| JP | 6067596 B2 | 1/2017 |
| KR | 2003-0061292 | 7/2003 |
| KR | 10-2009-0020869 | 2/2009 |
| KR | 101042115 B1 * 6/2011 ........ H04L 63/065 |
| WO | WO 2016/175105 A1 | 11/2016 |

OTHER PUBLICATIONS

Japanese Office Action dated Apr. 17, 2018 in JP Application No. 2017-183990 filed on Sep. 25, 2017 (with English translation).
Japanese Office Action dated Sep. 11, 2018 in JP Application No. 2017-183990 filed on Sep. 25, 2017 (with English translation).
Yoshida, R. et al., "A Secure Business Chat System that Prevents Leakage and Eavesdropping from the Server by Advanced Encryption Technology", NTT Technical Review, Feb. 2017, vol. 29, No. 2, pp. 18-21, retrieved from the internet: URL: http://www.ntt.co.jp/journal/1702/files/jn20170218.pdf [retrieved on Mar. 29, 2018] (with partial translation).
Baugher, M. et al., "The Secure Real-time Transport Protocol (SRTP)", Mar. 2004, URL: https://tools.ietf.org/html/rfc3711, pp. 1-56, searched on Sep. 21, 2017.
Andreasen, F. et al., "Session Description Protocol (SDP) Security Descriptions for Media Streams", Jul. 2006, URL: https://tools.ietf.org/html/rfc4568, pp. 1-44, searched on Sep. 21, 2017.
Zimmermann, P. et al., "ZRTP: Media Path Key Agreement for Unicast Secure RTP", Apr. 2011, pp. 1-115, URL: https://tools.ietf.org/html/rfc6189, searched on Sep. 21, 2017.
Kent, S., "IP Encapsulating Security Payload (ESP)", Nov. 1998, URL: https://www.ietf.org/rfc/rfc2406.txt, searched on Sep. 21, 2017, total 17 pages.
Kaufman, C., "Internet Key Exchange Protocol Version 2 (IKEv2)", Sep. 2010, pp. 1-138, URL: https://tools.ietf.org/html/rfc5996, searched on Sep. 21, 2017.

(56) References Cited

OTHER PUBLICATIONS

Tamura, T. et al., "A study on secured SIP services in IP mobility environment", IEICE Technical Report, Sep. 2003, vol. 103, No. 313, pp. 67-70, NS2003-100, IN2003-66, CS2003-75 (with English Abstract).

Yoneyama, K., et al., "Multi-Cast Key Distribution: Scalable, Dynamic and Provably Secure Construction", total 28 pages Cryptology ePrint Archive, Report 2016/833 (ver. 20160831:163538), URL:https://eprint.iacr.org/2016/833/20160831:163538, [retrieved on: Mar. 29, 2018].

Extended European Search Report dated May 13, 2020 in European Application No. 18859260.4.

"Telecommunications and Internet Converged Services and Protocols for Advanced Networking (TISPAN); Feasibility study on media security", No. V0.0.8, Oct. 1, 2007, XP014039215.

Office Action dated Aug. 26, 2020 in Korean Application No. 10-2019-7011833 (w/English translation).

Behrouz A. Forouzan, ("Cryptography and Network Security"), Special Indian Edition, Tata McGraw-Hill, 2007 (737 pages).

Office Action dated Jun. 3, 2020 in Chinese Application No. 201880004112.0 (w/English translation).

\* cited by examiner

FIG.10

| TELEPHONE NUMBER | FUNCTION |
|---|---|
| TELEPHONE NUMBER 1 | SECRET COMMUNICATION, ··· |
| TELEPHONE NUMBER 2 | ······ |
| TELEPHONE NUMBER 3 | ······ |
| ⋮ | ⋮ |

COMMUNICATION APPARATUS, COMMUNICATION METHOD, AND PROGRAM

TECHNICAL FIELD

The present invention relates to a secret communication technology that performs communication by transmitting and receiving encrypted packets.

BACKGROUND ART

A technology that uses Internet Protocol (IP) to enable voice communication by transmitting/receiving voice packets is widely used. An IP network such as the Internet where voice packets are transmitted and received may be subject to eavesdropping through interception of voice packets. In order to protect against such eavesdropping, a technology that transmits and receives encrypted voice packets is known.

For example, a technology is known that uses a key exchange scheme such as SDP Security Descriptions for Media Streams (SDES) disclosed in Non-Patent Document 3 to exchange keys between terminals, such that encrypted communication can be performed by using, for example, a SRTP (Non-Patent Document 2) or an ESP (Non-Patent Document 5). The keys obtained by key exchange are used until communication ends.

RELATED-ART DOCUMENTS

Patent Documents

[PATENT DOCUMENT 1] Japanese Patent No. 5612494
[PATENT DOCUMENT 2] Japanese Patent No. 5253567
[PATENT DOCUMENT 3] Japanese Patent No. 5334873
[PATENT DOCUMENT 4] Japanese Patent No. 5349261
[PATENT DOCUMENT 5] Japanese Patent No. 5424974
[PATENT DOCUMENT 6] Japanese Patent No. 5769401
[PATENT DOCUMENT 7] Japanese Patent No. 5852551
[PATENT DOCUMENT 8] Japanese Patent No. 5852594
[PATENT DOCUMENT 9] Japanese Patent No. 6067596
[PATENT DOCUMENT 10] Japanese Laid-Open Publication No. 2016-213543
[PATENT DOCUMENT 11] Japanese Laid-Open Publication No. 2016-134826

Non-Patent Documents

[NON-PATENT DOCUMENT 1] "A Secure Business Chat System that Prevents Leakage and Eavesdropping from the Server by Advanced Encryption Technology," NTT Technical Review, 2017 February
[NON-PATENT DOCUMENT 2] SRTP, https://tools.ietf.org/html/rfc3711, searched on Sep. 21, 2017
[NON-PATENT DOCUMENT 3] Security Descriptions for Media Streams, https://tools.ietf.org/html/rfc4568, searched on Sep. 21, 2017
[NON-PATENT DOCUMENT 4] ZRTP, https://tools.ietf.org/html/rfc6189, searched on Sep. 21, 2017
[NON-PATENT DOCUMENT 5] IP Encapsulating Security Payload (ESP), https://www.ietf.org/rfc/rfc2406.txt, searched on Sep. 21, 2017
[NON-PATENT DOCUMENT 6] Internet Key Exchange Protocol Version 2 (IKEv2), https://tools.ietf.org/html/rfc5996, searched on Sep. 21, 2017

SUMMARY OF THE INVENTION

Problem to be Solved by the Invention

In the above-described key exchange scheme such as SDES, although encrypted communication can be promptly started, keys are sent over a communication path during key exchange and are used until the communication ends. Accordingly, there is a possibility that keys may be illegally obtained for eavesdropping, and thus the communication is not secure.

With a key exchange scheme that uses ZRTP (Non-Patent Document 4) or IKE (Non-Patent Document 5), it is possible to perform encrypted communication without sending keys over a communication path. However, it takes time to complete key exchange, thus causing a delay in starting encrypted communication. In a case where communication is immediately started, the communication until encrypted communication starts is not secure.

The above-described problems may occur not only in voice communication, but also in any other media communication such as video communication and data communication.

The present invention is made in view of the above-described points, and an object of the present invention is to provide a technology that enables secure media communication between terminals.

Means to Solve the Problem

According to a technology disclosed herein, a communication apparatus for use in a communication system including a call control apparatus and a key information distribution apparatus is provided. The communication apparatus includes a key generation means configured to, when media communication is performed between the communication apparatus and another communication apparatus, request the key information distribution apparatus to provide common key generation information for generating a first common key, a call control means configured to establish a call connection between the communication apparatus and said another communication apparatus by transmitting a call connection request to the call control apparatus, and a communication means configured to transmit and receive an encrypted media packet by using a second common key, wherein the key generation means generates the first common key by using the common key generation information received from the key information distribution apparatus, and after the first common key is generated, the communication means transmits and receives an encrypted media packet by using the first common key.

Effects of the Invention

According to a technology disclosed herein, it is possible to provide a technology that enables secure media communication between terminals.

BRIEF DESCRIPTION OF THE DRAWINGS

FIG. 10 is a diagram illustrating an example of a table retained by a data storage unit of the SIP server 100.

MODE FOR CARRYING OUT THE INVENTION

In the following, embodiment(s) of the present invention will be described with reference to the accompanying drawings. The embodiments described below are merely examples, and embodiments to which the present invention is applied are not limited to the following embodiments. For example, in the following embodiments, voice communication is described as an example of media communication; however, the present invention may be applied to any other media communication such as video communication and data communication (such as a chat).

In the embodiments, a multicast key sharing technology disclosed in Patent Documents 1 through 11 and Non-Patent Document 1 is used. The technology according to the embodiments allows multiple terminals to share a common key via a key server (a key server 200 described later). The common key is generated by each terminal performing a secret calculation by using common key generation information (more specifically, random numbers) distributed from the key server to each of the terminals. Such information will not be sent over a network, thus preventing other general terminals from generating the common key. Thus, by using the technology according to the embodiments, voice communication can be performed more securely than the conventional technologies described in Background Art.

It is noted that the multicast key sharing technology itself that generates a common key by using common key generation information is a known technology. However, the technology disclosed herein is a new technology that performs voice communication by combining the multicast key sharing technology with, for example, a SIP server, which will be described later.

Further, in the embodiments, as an example of a scheme that does not send keys over a communication path, the multicast key sharing technology disclosed in Patent Documents 1 through 11 and Non-Patent Document 1 is used. However, any technology other than the multicast key sharing technology may be used as a scheme that does not send keys over a communication path. For example, ZRTP or IKE may be used. Even in the case of a technology (such as ZRTP or IKE) other than the multicast key sharing technology, each terminal can use common key generation information received from the key server 200 and generate a common key to be used to encrypt voice communication.

The embodiments will be described in detail below.
(System Configuration)

Figure 1:
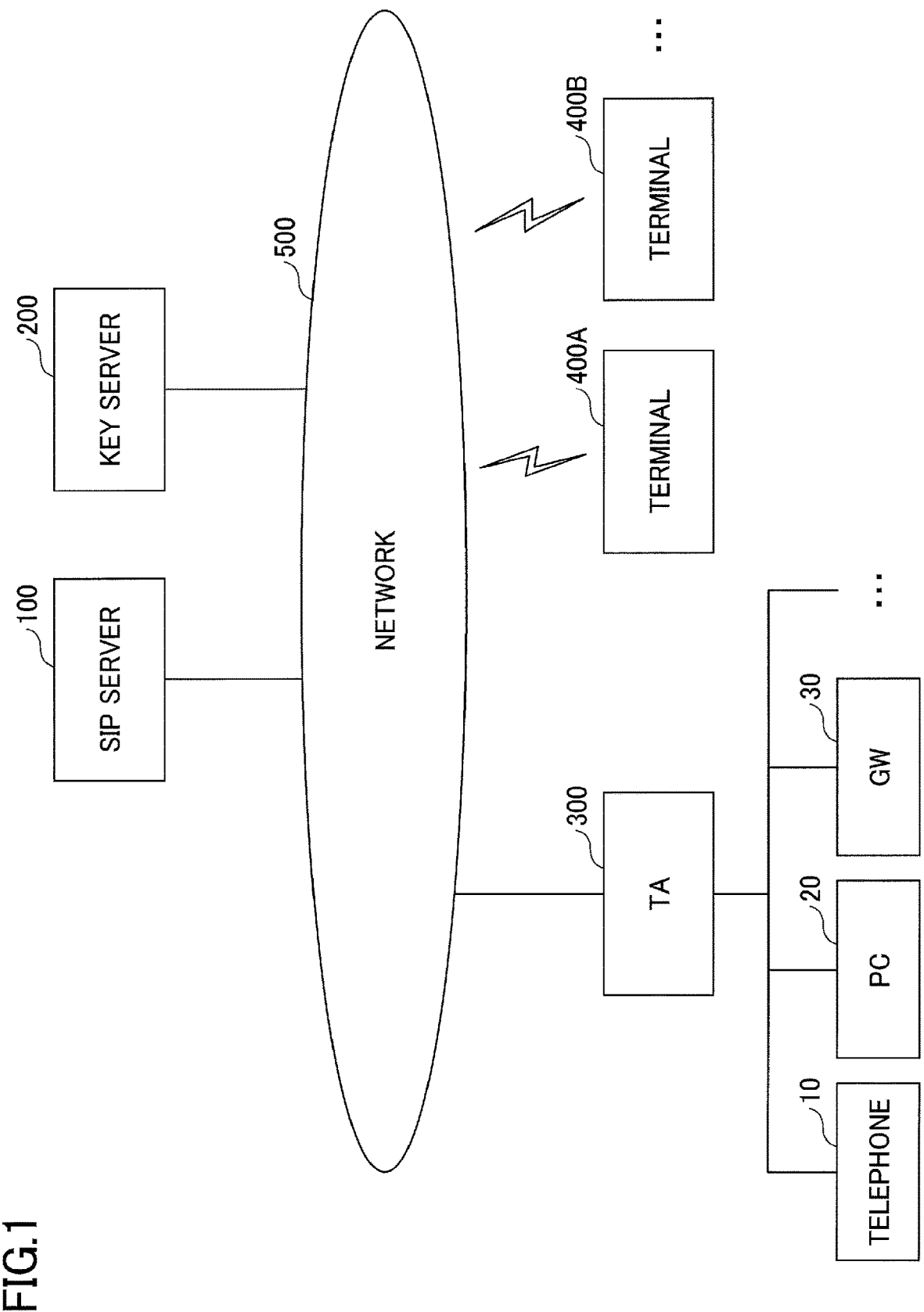
FIG. 1 is a diagram illustrating a configuration example of a communication system according to an embodiment of the present invention.

FIG. 1 illustrates a configuration example of a communication system according to an embodiment of present invention. As illustrated in FIG. 1, the communication system includes a session initiation protocol (SIP) server 100, the key server 200, a terminal adapter (TA) 300, and terminals 400A and 400B, which are connected to a network 500. It is noted that the TA 300 is an example of a terminal. Also, the TA 300 and the terminals 400A and 400B may be collectively referred to as a communication apparatus.

The SIP server 100 is an apparatus that establishes a call connection between terminals by transmitting/receiving a SIP message. The SIP is a call control protocol.

The key server 200 is an apparatus that controls distribution of common key generation information used for the above-described multicast key sharing technology.

The TA 300 is an apparatus connected to a terminal (such as a commonly used IP telephone) that does not have a secret communication function and that is connected by the TA 300. The TA 300 enables secret communication by performing an encryption process and a decryption process in place of the terminal. In the example illustrated in FIG. 1, a telephone 10, a PC 20, and a GW 30 are connected by the TA 300. For example, the telephone 10 is a commonly used IP telephone. The PC 30 is a computer having a softphone installed as an application. The GW 30 is, for example, a PRI or a FXS. Under control of the GW 30, a telephone and a PBX are connected, for example.

For example, the terminals 400A and 400B are telephone terminals such as smartphones. The terminals 400A and 400B each have the secret communication function according to the present embodiment. It is noted that the terminal 400A and the terminal 400B are, if not distinguished, referred to as "terminals 400".

The network 500 is a network consisting of one or more of a plurality of networks such as a mobile network (such as 3G or LTE), the Internet, a landline network, and a private network.

Next, functional configurations of the SIP server 100, the key server 200, the TA 300, and the terminals 400, and operational overviews of units will be described. In the following, only the operational overviews are described, and details are described later with reference to sequences.

Figure 2:
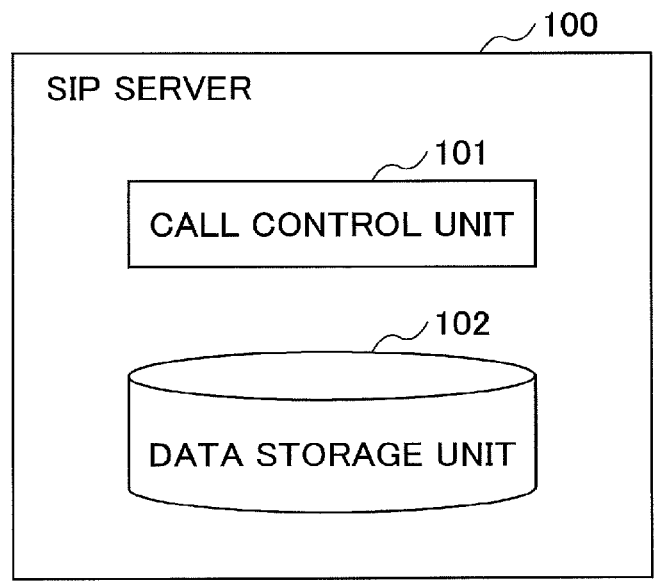
FIG. 2 is a diagram illustrating a functional configuration of a SIP server 100.

FIG. 2 is a diagram illustrating a functional configuration of the SIP server 100. As illustrated in FIG. 2, the SIP server 100 includes a call control unit 101 and a data storage unit 102. The call control unit 101 generates and transmits/receives a call control message such as an INVITE message. Also, the call control unit 101 includes a function for replying to an inquiry from the TA 300, as will be described later. For example, the data storage unit 103 stores, for each telephone number of a terminal, information on functions (such as secret communication) available to the terminal.

Figure 3:
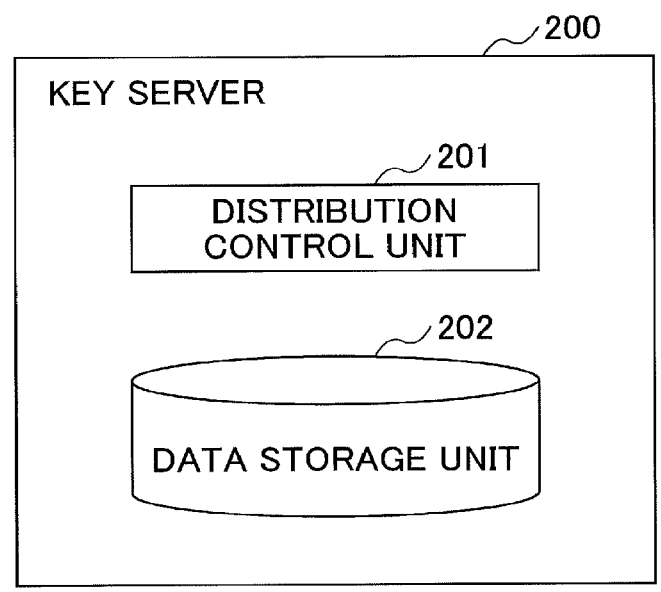
FIG. 3 is a diagram illustrating a functional configuration of a key server 200.

FIG. 3 is a diagram illustrating a functional configuration of the key server 200. As illustrated in FIG. 3, the key server 200 includes a distribution control unit 201 and a data storage unit 202. The distribution control unit 201 distributes common key generation information to the terminals 400 and/or the TA 300. Also, the distribution control unit 201 distributes updated common key generation information based on the status of each session stored in the data storage unit 202. The data storage unit 202 stores status information for each session related to key generation.

Figure 4:
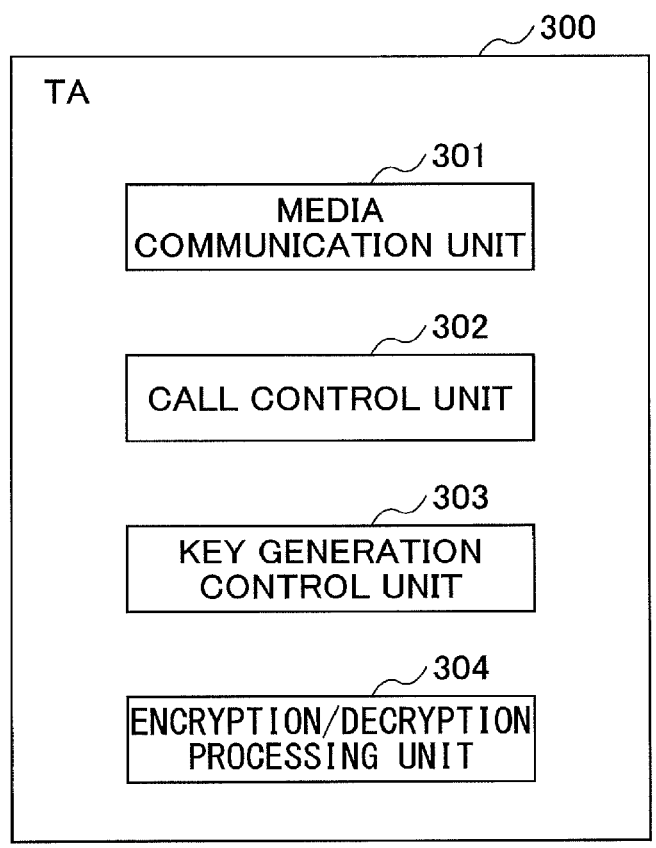
FIG. 4 is a diagram illustrating a functional configuration of a TA 300.

FIG. 4 is a diagram illustrating a functional configuration of the TA 300. As illustrated in FIG. 4, the TA 300 includes a media communication unit 301, a call control unit 302, a key generation control unit 303, and an encryption/decryption processing unit 304. The media communication unit 301 may be referred to as a transmitting/receiving device. The media communication unit 301 transmits/receives a media packet (a voice packet in the present embodiment). The call control unit 302 transmits/receives a call control message.

The key generation control unit 303 generates a common key based on common key generation information received from the key server 200, by using the multicast key sharing technology. Further, the key generation control unit 303 can generate a common key based on a scheme existing prior to the multicast key sharing technology. As used herein, an existing scheme means any conventional common key scheme other than the multicast key sharing technology.

The encryption/decryption processing unit 304 encrypts a voice packet and decrypts an encrypted voice packet, by using a common key generated by the key generation control unit 303.

Figure 5:
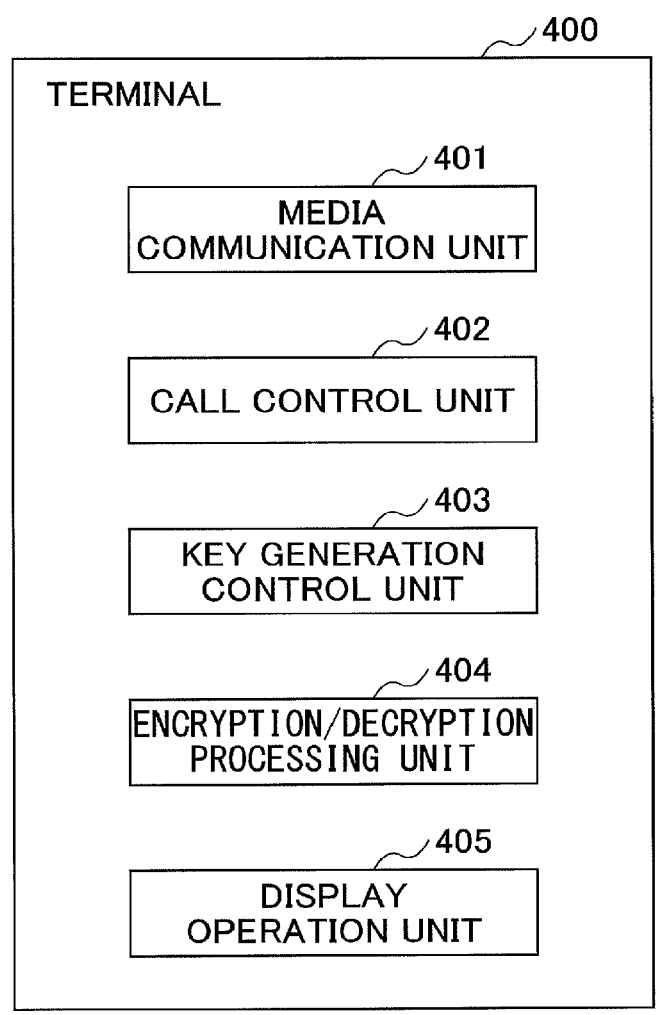
FIG. 5 is a diagram illustrating a functional configuration of a terminal 400.

FIG. 5 is a diagram illustrating a functional configuration of each of the terminals 400. As illustrated in FIG. 5, the terminals 400 each include a media communication unit 401, a call control unit 402, a key generation control unit 403, an encryption/decryption processing unit 404, and a display operation unit 405. The media communication unit 401 may be referred to as a transmitting/receiving device.

The media communication unit 401 transmits/receives media data (a voice packet in the present embodiment). The call control unit 402 generates and transmits/receives a call control message. The key generation control unit 403 generates a common key based on common key generation information received from the key server 200, by using the multicast key sharing technology. Further, the key generation control unit 403 can generate a common key based on the existing scheme.

The encryption/decryption processing unit 404 encrypts a voice packet and decrypts an encrypted voice packet, by using a common key generated by the key generation control unit 403.

The display operation unit 405 displays information and also receives information input by a user. The display operation unit 405 may be implemented by, for example, a touch panel.

The above-described apparatuses (the SIP server 100, the key server 200, the TA 300, and the terminals 400) may each be implemented by causing a computer to execute a program that describes processes described in the present embodiment. Namely, the functions of each of the above-described apparatuses may be implemented by executing a program corresponding to processes performed in each of the apparatuses, by using hardware resources such as a CPU and a memory included in the computer. The program can be recorded in a computer-readable recording medium (such as a portable memory), such that the program can be saved and distributed. Also, the program can be provided via a network such as the Internet and electronic mail.

Figure 6:
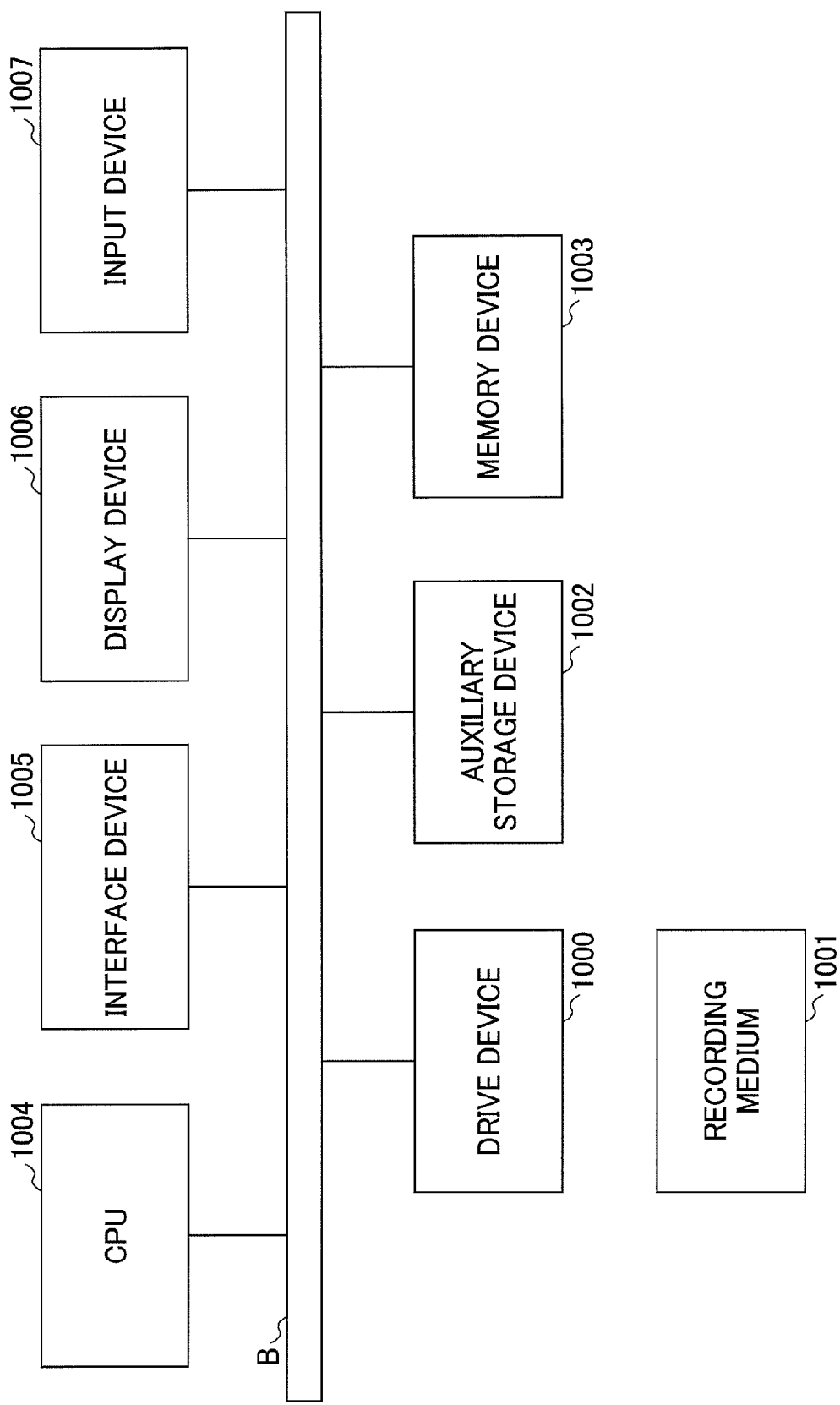
FIG. 6 is a diagram illustrating a hardware configuration of an apparatus.

FIG. 6 is a diagram illustrating a hardware configuration of one apparatus of the above-described apparatuses. The apparatus illustrated in FIG. 6 includes a drive device 1000, an auxiliary storage device 1002, a memory device 1003, a CPU 1004, an interface device 1005, a display device 1006, and an input device 1007, which are connected to each other via a bus B. It is noted that the display device 1006 and the input device 1007 are not necessarily included in the SIP server 100, the key server 200, and the TA 300.

A program that implements processes in the apparatus of FIG. 6 is provided by a recording medium 1001 such as a CD-ROM or a memory card. When the recording medium 1001 storing the program is set in the drive device 1000, the program is installed in the auxiliary storage device 1002 from the recording medium 1001 via the drive device 1000. However, the program is not necessarily installed from the recording medium 1001, and may be downloaded from another computer via a network. The auxiliary storage device 1002 stores the installed program, and also stores necessary files and data.

In response to an instruction to start a program, the memory device 1003 reads the program from the auxiliary storage device 1002 and stores the program. The CPU 1004 implements functions of the apparatus in accordance with the program stored in the memory device 1003. The interface device 1005 is used as an interface for connecting to a network. The display device 1006 displays a graphical user interface (GUI) provided by a program. The input device 1007 includes a keyboard and a mouse, buttons, or a touch panel, and is used to input various operation instructions.

Operation Example 1 of Communication System

Next, an operation example 1 of the communication system according to the embodiment will be described with reference to a sequence diagram illustrated in FIG. 7. In the operation example 1, secret voice communication is performed between the terminal 400A and the terminal 400B. In the following description, the functional units of the apparatuses described in FIG. 2 through FIG. 5 are used as appropriate. Also, in the following description, the functional units of the terminal 400A are described as a media communication unit 401A, a call control unit 402A, a key generation control unit 403A, an encryption/decryption processing unit 404A, and a display operation unit 405A. The functional units of the terminal 400B are described as a media communication unit 401B, a call control unit 402B, a key generation control unit 403B, an encryption/decryption processing unit 404B, and a display operation unit 405B.

First, when a user of the terminal 400A performs an operation for making a phone call by, for example, inputting a telephone number of the terminal 400B on the terminal 400A, the key generation control unit 403A of the terminal 400A transmits, to the key server 200, a message for starting a key generation session, and as a result, the key generation session is started (step S101). The message includes an ID for identifying the key generation session. The ID included in the message is denoted as ID-S. The message is also a message requesting distribution of common key generation information.

Next, the call control unit 402A of the terminal 400A transmits an INVITE message, corresponding to a request for a call connection, to the terminal 400B (S102). The INVITE message includes Key1. The Key1 is a common key based on the existing scheme (a common key used for encryption and decryption). The encryption/decryption processing unit 404A of the terminal 400A retains the Key1 and uses the Key1 to encrypt a voice packet, and the media communication unit 401A transmits the encrypted voice packet. Also, the ID-S indicated to the key server 200 in S101 may be included in the INVITE message transmitted in S102.

In the present embodiment, as described above, it is assumed that the common key itself is transmitted with the INVITE message; however, this is merely an example. For example, Key1 and Key2 may be components for generating common keys, and the terminal 400A and the terminal 400B may each generate same common keys from the Key1 and the Key2.

It takes some time after the key server 200 receives the message including the ID-S from the terminal 400A, until common key generation information is distributed. Therefore, in the present embodiment, in order to promptly start secret communication, common keys based on the existing scheme are used until common keys based on common key generation information are generated.

The SIP server 100 receives the INVITE message transmitted from the terminal 400A, and transmits the INVITE message to the terminal 400B (S103). In the terminal 400B, which has received the INVITE message, the key generation control unit 403B transmits, to the key server 200, a message requesting common key generation information based on the multicast key sharing technology (S104). The message includes the same ID-S used in S101.

Also, the encryption/decryption processing unit 404B of the terminal 400B stores, in the memory, the Key1 included in the received INVITE message. The Key1 is used to decrypt an encrypted voice packet to be received from the terminal 400A. In a case where Key1 and Key2 are components for generating common keys, the encryption/decryption processing unit 404B of the terminal 400B generates common keys from the Key1 and the Key2, and retains the common keys for use for encryption and decryption.

The terminal 400B transmits a 180 Ringing message, and the terminal 400A receives the 180 Ringing message (S105, S106).

Subsequently, when a user of the terminal 400B performs an operation for accepting the phone call, the call control unit 402B transmits a 200 OK message (S107). The 200 OK message includes a Key2. The Key2 is a common key used by the encryption/decryption processing unit 404B of the terminal 400B to encrypt a voice packet.

The terminal 400A receives the 200 OK message (S108). The encryption/decryption processing unit 404A of the terminal 400A retains the Key2 included in the 200 OK message. The Key2 is used to decrypt an encrypted voice packet to be received from the terminal 400B. In a case where Key1 and Key2 are components for generating common keys, the encryption/decryption processing unit 404A of the terminal 400A generates common keys from the Key1 and the Key2, and retains the common keys for use for encryption and decryption.

After the terminal 400A receives the 200 OK message, secret voice communication using the Key1 and the Key2 is started between the media communication unit 401A of the terminal 400A and the media communication unit 401B of the terminal 400B (S109).

Subsequently, the distribution control unit 201 of the key server 200 transmits, to each of the terminal 400A and the terminal 400B, common key generation information (SecretKey-1) of the key generation session identified by the ID-S indicated in S101 (S110, S111).

The key generation control unit 403A of the terminal 400A, which has received the common key generation information (SecretKey-1), generates a common key (SecretKey-1') to be used to encrypt/decrypt a voice packet (S112). Similarly, the key generation control unit 403B of the terminal 400B, which has received the common key generation information (SecretKey-1), generates a common key (SecretKey-1') to be used to encrypt/decrypt a voice packet (S113).

Further, the key generation control unit 403A of the terminal 400A transmits, to the key server 200, a key generation completion message indicating that generation of the common key (SecretKey-1') has been completed (S114). Similarly, the key generation control unit 403B of the terminal 400B transmits, to the key server 200, a key generation completion message indicating that generation of the common key (SecretKey-1') has been completed (S115).

Upon detecting reception of the key generation completion messages from both the terminal 400A and the terminal 400B, which join the same key generation session identified by the ID-S, the distribution control unit 201 of the key server 200 transmits, to each of the terminal 400A and the terminal 400B, a key generation completion message indicating that key generation has been completed in both the terminal 400A and the terminal 400B, which join the same key generation session identified by the ID-S (S116, S117).

In the terminal 400A, which has received the key generation completion message in S116, since generation of the common key has completed at the other end of the session (namely, in the terminal 400B), the key generation control unit 403A determines that encrypted communication is possible, and instructs the encryption/decryption processing unit 404A to switch the common keys from Key1/Key2 to the common key (SecretKey-1'). Similarly, in the terminal 400B, which has received the key generation completion message in S117, since generation of the common key has completed at the other end of the session (namely, in the terminal 400A), the key generation control unit 403B determines that encrypted communication is possible, and instructs the encryption/decryption processing unit 404B to switch the common keys from the Key1/Key2 to the common key (SecretKey-1').

As a result of switching the keys described above, secret voice communication using the common keys (SecretKey-1') is performed in S118. More specifically, the encryption/decryption processing unit 404A of the terminal 400A uses the common key (SecretKey-1') to encrypt a voice packet to be transmitted, and uses the common key (SecretKey-1') to decrypt an encrypted voice packet received. Similarly, the encryption/decryption processing unit 404B of the terminal 400B uses the common key (SecretKey-1') to encrypt a voice packet to be transmitted, and uses the common key (SecretKey-1') to decrypt an encrypted voice packet received.

For example, the key server 200 transmits updated common key generation information to each of the terminals 400 at predetermined time intervals, and each of the terminals 400 generates an updated common key.

For example, the data storage unit 202 of the key server 200 stores, on a per-key-generation-session basis, status information including a time at which common key generation information is transmitted, a time at which key generation is determined to be completed (such as a time at which a key generation completion message is transmitted to all terminals joining a session), and a time at which an update is made.

As an example, the distribution control unit 201 of the key server 200 refers to status information of the data storage unit 202, and distributes updated common key generation information to each of the terminals 400 when a predetermined period of time T has elapsed from a time at which key generation is determined to be completed.

Figure 7:
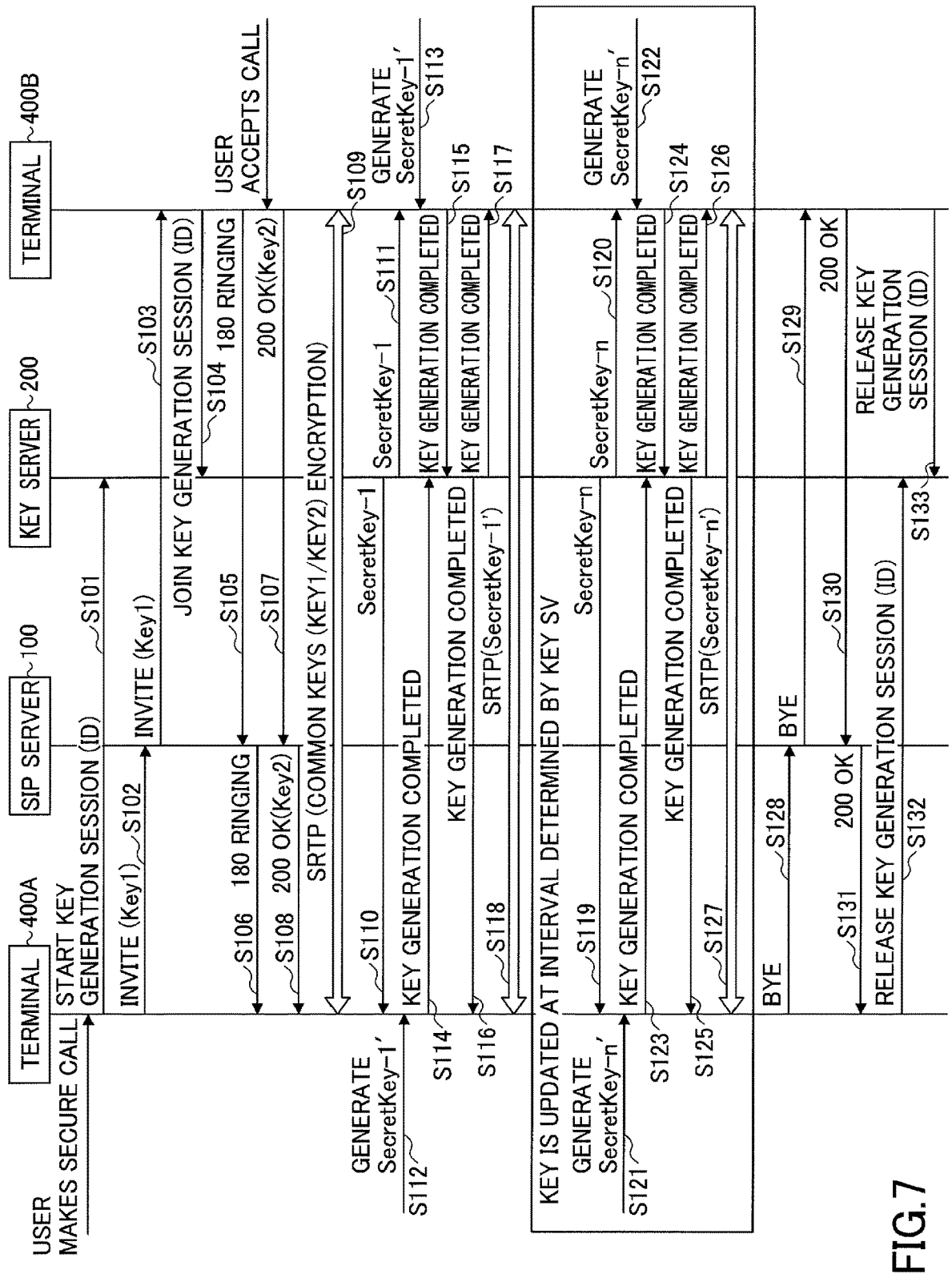
FIG. 7 is a sequence diagram illustrating an operation example of the communication system.

In the example illustrated in FIG. 7, when the distribution control unit 201 of the key server 200 detects that the predetermined period of time T has elapsed from times at which S116 and S117 are performed (which are considered to be the same time, for convenience), and the distribution control unit 201 transmits updated common key generation information "SecretKey-2" to the terminal 400A and the terminal 400B (S119, S120). Common key generation information is updated repeatedly at time T intervals. Thus, in order to express repeated updates, "SecretKey-n" is used in FIG. 7. In the following description, "SecretKey-n" is used.

The key generation control unit 403A of the terminal 400A, which has received the common key generation information (SecretKey-n), generates a common key (SecretKey-n') to be used to encrypt and decrypt a voice packet (S121). Similarly, the key generation control unit 403B of the terminal 400B, which has received the common key generation information (SecretKey-n), generates a common key (SecretKey-n') to be used to encrypt and decrypt a voice packet (S122).

Further, the key generation control unit 403A of the terminal 400A transmits, to the key server 200, a key generation completion message indicating that generation of the common key (SecretKey-n') has been completed (S123). Similarly, the key generation control unit 403B of the terminal 400B transmits, to the key server 200, a key generation completion message indicating that generation of the common key (SecretKey-n') has been completed (S124).

Upon detecting reception of the key generation completion messages from both the terminal 400A and the terminal 400B, which join the same key generation session identified by the ID-S, the distribution control unit 201 of the key server 200 transmits, to each of the terminal 400A and the terminal 400B, a key generation completion message indicating that key generation has been completed in both the terminal 400A and the terminal 400B, which join the same key generation session identified by the ID-S (S125, S126).

In the terminal 400A, which has received the key generation completion message in S125, since generation of the common key has completed in the terminal 400B, the key generation control unit 403A determines that encrypted communication is possible, and instructs the encryption/decryption processing unit 404A to switch the common keys from the common key (SecretKey-(n−1)') to the common key (SecretKey-n'). Similarly, in the terminal 400B, which has received the key generation completion message in S126, since generation of the common key has completed in the terminal 400A, the key generation control unit 403B determines that encrypted communication is possible, and instructs the encryption/decryption processing unit 404B to switch the common keys from the common key (SecretKey-(n−1)') to the common key (SecretKey-n') As a result of switching the keys described above, secret voice communication using the common keys (SecretKey-n') is performed in S127.

The above sequence is merely an example. For example, regardless of whether a key generation completion message is received from the key server 200, each of the terminals 400 may switch to updated common key when a predetermined period of time has elapsed after generation of the updated common key. This approach can also be applied when common keys based on the existing scheme are switched to a common key based on the multicast key sharing technology. This approach can also be applied to the TA 300.

Subsequently, when the user of the terminal 400A performs an operation for ending the phone call, a BYE message is transmitted (S128, S129), and the terminal 400B returns a 200 OK message (S130, S131). Further, each of the terminal 400A and the terminal 400B transmits, to the key server 200, a message releasing the key generation session (S132, S133).

In the above-described process, if assuming that the key server 200 failed after distribution of common key generation information (SecretKey-1'), updated common key generation information would not be transmitted.

In light of the above, in the present embodiment, similarly to the key server 200, the key generation control unit 403A of the terminal 400A measures an elapsed time from a time at which key generation is completed. For example, in a case where updated common key generation information is not received after the predetermined period of time T has elapsed from a time at which key generation is completed, the key generation control unit 403A of the terminal 400A instructs the encryption/decryption processing unit 404A to continue to use the current common key (SecretKey-1 in this example). In accordance with the instruction, the encryption/decryption processing unit 404A continues to use the current common key. Alternatively, in a case where updated common key generation information is not received after the predetermined period of time T has elapsed from a time at which key generation is completed, the key generation control unit 403A of the terminal 400A may instruct the encryption/decryption processing unit 404A to switch from the current common key to the common key (Key1/Key2) based on the existing scheme. The same applies to the terminal 400B.

Further, each of the terminals 400 may cause the display operation unit 405 to display information whether voice communication is secret communication. For example, when the encryption/decryption processing unit 404 encrypts/decrypts a voice packet by using a common key, the encryption/decryption processing unit 404 indicates such information to the display operation unit 405, and the display operation unit 405 displays information indicating that secret communication is performed. Also, for example, when the encryption/decryption processing unit 404 does not encrypt/decrypt a voice packet by using a common key, the encryption/decryption processing unit 404 indicates such information to the display operation unit 405, and the display operation unit 405 displays information indicating that secret communication is not performed.

Also, when the encryption/decryption processing unit 404 encrypts/decrypts a voice packet by using a common key, the encryption/decryption processing unit 404 indicates the type of a common key (such as a common key based on the existing scheme or a common key based on the multicast key sharing technology) to the display operation unit 405. Then, the display operation unit 405 may display information indicating that secret communication is performed and also indicating the type of encryption (such as the existing scheme or the multicast key sharing technology).

Also, in each of the terminals 400, for example, after a destination telephone number is input by a user, the call control unit 402 may cause the display operation unit 405 to display information allowing the user to select whether to perform secret communication or to perform ordinary communication that does not ensure secrecy, and in accordance with the user's selection, the call control unit 402 may determine whether the secret communication is performed or the ordinary communication that does not ensure secrecy is performed.

Operation Example 2 of Communication System

Figure 8:
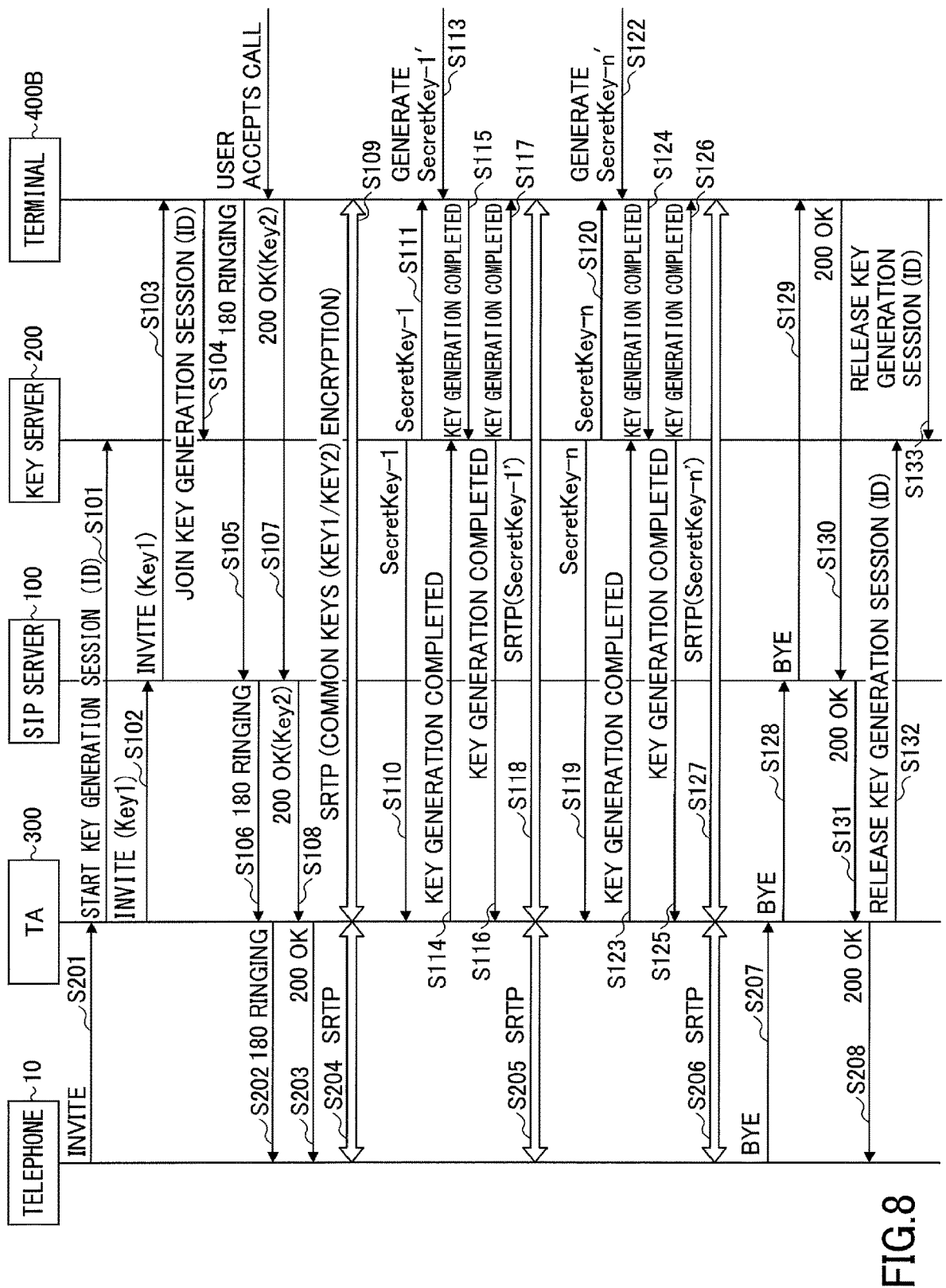
FIG. 8 is a sequence diagram illustrating an operation example of the communication system.

Next, an operation example 2 of the communication system according to the embodiment will be described with reference to a sequence diagram illustrated in FIG. 8. In the operation example 2, secret voice communication is performed between the terminal 400B and the telephone 10 (a commonly used IP telephone) connected by the TA 300. The telephone does not have a secret communication function. Thus, the TA 300 encrypts and decrypts voice packets in place of the telephone 10. Voice packets transmitted/received between the TA 300 and the telephone 10 are not encrypted. However, in a normal situation, the TA 300 and the telephone 10 are connected via a private network such as a LAN inside an office, and data does not pass through a public network such as the Internet. Because high secrecy can be provided, a problem does not particularly occur.

A process sequence between the TA 300 and the terminal 400B is basically the same as the process sequence between the terminal 400A and the terminal 400B. In the following, a process sequence between the TA 300 and the telephone 10 will be mainly described.

When a user of the telephone 10 performs an operation for making a phone call by, for example, inputting a telephone number of the terminal 400B on the telephone 10, the telephone 10 transmits an INVITE message (step S201).

In the TA 300, which has received the INVITE message, the key generation control unit 303 transmits, to the key server 200, a message requesting common key generation information (S101). After S102 through S106 are performed, the TA 300 transfers a 180 Ringing message received in S106 to the telephone 10 (S202). Also, the TA 300 excludes Key2 from a 200 OK message received in S108, and transmits the 200 OK message to the telephone 10 (S203).

Subsequently, voice communication is performed between the telephone 10 and the terminal 400B (S204, S108). To be more specific, the encryption/decryption processing unit 304 of the TA 300 uses a common key based on the existing scheme to encrypt a voice packet received from the telephone 10, and the media communication unit 301 transmits the encrypted voice packet to the terminal 400B. Also, the encryption/decryption processing unit 304 of the TA 300 uses the common key based on the existing scheme to decrypt an encrypted voice packet received from the terminal 400B, and the media communication unit 301 transmits the decrypted voice packet to the telephone 10.

Subsequently, as described above with reference to FIG. 7, common keys used for secret communication between the TA 300 and the terminal 400B are updated. However, the telephone 10 is not aware of any update, and continues to transmit/receive normal voice packets (S205, S206). Subsequently, the voice communication ends (S207, S208).

In the above-described process, if assuming that the key server 200 failed after distribution of common key generation information (SecretKey-1'), updated common key generation information would not be transmitted.

In light of the above, in the present embodiment, similarly to the key server 200, the key generation control unit 303 of the TA 300 measures an elapsed time from a time at which key generation is completed. For example, in a case where updated common key generation information is not received after the predetermined period of time T has elapsed from a time at which key generation is completed, the key generation control unit 303 of the TA 300 instructs the encryption/decryption processing unit 304 to continue to use the current common key (SecretKey-1 in this example). In accordance with the instruction, the encryption/decryption processing unit 304 continues to use the current common key. Alternatively, in a case where updated common key generation information is not received after the predetermined period of time T has elapsed from a time at which key generation is completed, the key generation control unit 303 of the TA 300 may determine that the common key based on the existing scheme is used, and may instruct the encryption/decryption processing unit 304 to switch from the current common key to the common key based on the existing scheme. The same applies to the terminal 400B.

Further, TA 300 may indicate, to the telephone 10, information whether voice communication is secret communication, and may cause the telephone 10 to display the information. For example, when the encryption/decryption processing unit 304 encrypts/decrypts a voice packet by using a common key, the encryption/decryption processing unit 304 indicates such information to the telephone 10, and the telephone 10 displays information indicating that secret communication is performed. Also, for example, when the encryption/decryption processing unit 304 does not encrypt/decrypt a voice packet by using a common key, the encryption/decryption processing unit 304 may indicate such information to the telephone 10, and the telephone 10 may display information indicating that secret communication is not performed.

Also, when the encryption/decryption processing unit 303 encrypts/decrypts a voice packet by using a common key, the encryption/decryption processing unit 304 indicates the type of a common key (such as a common key based on the existing scheme or a common key based on the multicast key sharing technology) to the telephone 10. Then, the telephone 10 may display information indicating that secret communication is performed and also indicating the type of encryption (such as the existing scheme or the multicast key sharing technology).

(Example of Communication Control Performed by SIP Server 100)

Next, an example of communication control performed by the SIP server 100 will be described with reference to FIG. 9.

In this example, a user of the telephone 10 is not aware whether a terminal of a voice communication partner can perform secret communication. In this case, if the telephone 10 makes a call connection to a terminal that is not able to perform secret communication, such a call connection is restricted. Details will be described below.

Figure 9:
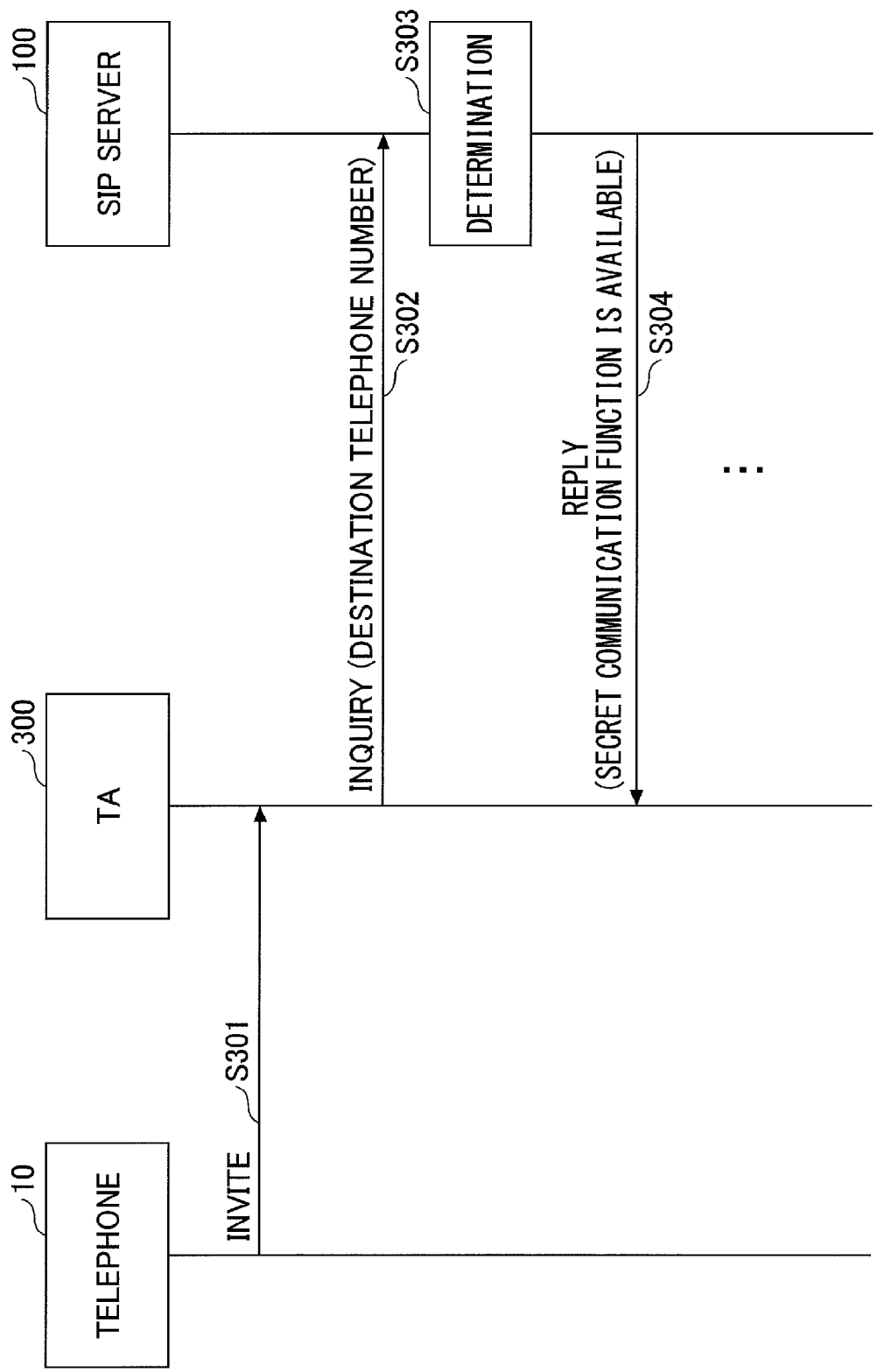
FIG. 9 is a diagram illustrating an operation example of communication control performed by the SIP server 100.

As illustrated in FIG. 9, the telephone 10 transmits an INVITE message that includes, as a destination, a telephone number of a communication partner (S301). In the TA 300, which has received the INVITE message, the call control unit 302 transmits, to the SIP server 100, an inquiry message that includes the destination telephone number included in the INVITE message (S302).

As illustrated in FIG. 10, for example, the data storage unit 102 of the SIP server stores a table that associates a telephone number with a function supported by a terminal having the telephone number.

Referring back to FIG. 9, the call control unit 101 of the SIP server 100, which has received the inquiry message including the destination telephone number in S302, searches the table illustrated in FIG. 10 based on the destination telephone number, and determines whether the terminal with the destination telephone number has the secret communication function (S303).

Then, the call control unit 101 of the SIP server 100 returns a reply message indicating a determination result to the TA 300 (S304). When the reply message indicates that "secret communication function is available", the process as of S101 illustrated in FIG. 8 is performed, and secret communication is performed.

When the reply message indicates that "secret communication function is unavailable", the call control unit 302 of the TA 300 indicates, to the telephone 10, a message indicating that communication with the terminal having the telephone number is not possible, and the telephone 10 displays the message. In this case, the call connection process is not continued.

Alternatively, when the reply message indicates that "secret communication function is unavailable", the call control unit 302 of the TA 300 may indicate, to the telephone 10, a message indicating that communication with the terminal having the telephone number is not secret communication, and may continue the call connection process without ensuring secrecy. The telephone 10 displays the message indicating that communication is not secret communication. This allows the user of the telephone 10 to perform voice communication while being aware that the communication is not secret communication.

For example, in communication between terminals that do not use the TA 300, when the call control unit 101 of the SIP server 100 determines that a designation terminal with a telephone number does not have the secret communication function by referring to the table retained by the data storage unit 102, the call control unit 101 may stop the call connection process and cause the destination terminal not to receive the call.

Further, the terminals 400 may each have a similar function as the above-described inquiry function of the TA 300. For example, in the process illustrated in FIG. 7, before S101 is performed, the call control unit 402A of the terminal 400A transmits, to the SIP server 100, an inquiry message including a destination telephone number input by a user, and receives a reply message indicating a determination result from the SIP server 100. When the reply message indicates that "secret communication function is available", the process as of S101 is performed, and secret communication is performed.

For example, when the reply message indicates that "secret communication function is unavailable", the call control unit 402 of the terminal 400A displays a message indicating that communication with a terminal having the input telephone number is not possible, and stops the call connection process. Alternatively, when the reply message indicates that "secret communication function is unavailable", the call control unit 402A of the terminal 400A may display a message indicating that communication with a terminal having the input telephone number is not secret communication, and may continue the call connection process without ensuring secrecy. The user who has viewed the message can perform voice communication while being aware that the communication is not secret communication.

Further, when the SIP server 100 detects that secret communication is performed between terminals, the SIP server 100 may prohibit the use of various types of transfer functions. This prevents another user from performing voice communication by impersonation. For example, in the example of FIG. 7, when the SIP server 100, which has received an INVITE message in S102, detects that both a source telephone number and a destination telephone number have the secret communication function by referring to information stored in the data storage unit 102, the SIP server 100 determines that a call to be established by the INVITE message is secret communication. Subsequently, for example, even if the call control unit 101 of the SIP server 100 receives, from the terminal 400B having received the INVITE message, an instruction to transfer the call established by the INVITE message to a terminal other than the terminal 400B, the call control unit 101 does not follow the instruction and does not transfer the call. In this case, the call control unit 101 may continue the call connection process illustrated in FIG. 7 or may stop the call connection process.

Summary of Embodiments

As described above, according to the embodiments, first, encrypted communication is started by using common keys based on the existing scheme, while generating common keys based on a scheme (such as the multicast key sharing scheme, ZRTP, or IKE) that does not send keys over a communication path. After generation is completed, the common keys based on the existing scheme are switched to the common keys based on the scheme such as the multicast key sharing scheme. Accordingly, secure communication can be promptly started.

According to the embodiments, a communication apparatus, a communication method, and a program described in the following are provided.

(Clause 1)

A communication apparatus for use in a communication system including a call control apparatus and a key information distribution apparatus is provided. The communication apparatus includes a key generation means configured to, when media communication is performed between the communication apparatus and another communication apparatus, request the key information distribution apparatus to provide common key generation information for generating a first common key, a call control means configured to establish a call connection between the communication apparatus and said another communication apparatus by transmitting a call connection request to the call control apparatus, and a communication means configured to transmit and receive an encrypted media packet by using a second common key, wherein the key generation means generates the first common key by using the common key generation information received from the key information distribution apparatus, and after the first common key is generated, the communication means transmits and receives an encrypted media packet by using the first common key.

(Clause 2)

The communication apparatus according to clause 1, wherein, in a case where updated common key generation information is received from the key information distribution apparatus, the key generation means generates an updated first common key by using the updated common key generation information, and the communication means transmits and receives an encrypted media packet by using the updated first common key.

(Clause 3)

The communication apparatus according to clause 2, wherein, in a case where the updated common key generation information is not received from the key information distribution apparatus after the key generation means generates the first common key by using the common key generation information and a predetermined period of time elapses, the communication means encrypts a media packet by using the first common key or the second common key.

(Clause 4)

The communication apparatus according to any one of clauses 1 to 3, wherein the call control means transmits, to the call control apparatus, an inquiry message that includes a telephone number of said another communication apparatus, and executes a process for establishing the call connection in response to reception of reply information indicating that said another communication apparatus has a secret communication function.

(Clause 5)

The communication apparatus according to any one of clauses 1 to 4, wherein the communication means encrypts a media packet received from a terminal that does not have the secret communication function so as to transmit the encrypted media packet to said another communication apparatus, and decrypts an encrypted media packet received from said another communication apparatus so as to transmit the decrypted media packet to the terminal that does not have the secret communication function.

(Clause 6)

A communication method performed by a communication apparatus for use in a communication system including a call control apparatus and a key information distribution apparatus is provided. The method includes a step of, when media communication is performed between the communication apparatus and another communication apparatus, requesting the key information distribution apparatus to provide common key generation information for generating a first common key, a step of establishing a call connection between the communication apparatus and said another communication apparatus by transmitting a call connection request to the call control apparatus, and a step of transmitting and receiving an encrypted media packet by using a second common key, and a step of, after generating the first common key by using the common key generation information received from the key information distribution apparatus, transmitting and receiving an encrypted media packet by using the first common key.

(Clause 7)

A program for causing a computer to function as the means included in the communication apparatus according to any one of clauses 1 to 5.

The SIP server 100 and the key server 200 are examples of the call control apparatus and the key information distribution apparatus, respectively. The key generation control units 303 and 403 are each an example of the key generation means. The call control units 302 and 402 are each an example of the call control means. The media communication units 301 and 401 and the encryption/decryption processing units 304 and 404 are each an example of the communication means.

Although the embodiments have been specifically described above, the present invention is not limited to the above-described embodiments, and various variations and modifications may be made without departing from the scope of the claims.

The present application is based on and claims priority to Japanese patent application No. 2017-183990 filed on Sep. 25, 2017, with the Japanese Patent Office, the entire contents of which are hereby incorporated by reference.

DESCRIPTION OF THE REFERENCE NUMERALS

100 SIP server
200 key server
300 TA
400 terminal
500 network
101 call control unit
102 data storage unit
201 distribution control unit
202 data storage unit
301 media communication unit
302 call control unit
303 key generation control unit
304 encryption/decryption processing unit
401 media communication unit
402 call control unit
403 key generation control unit
404 encryption/decryption processing unit
405 display operation unit
1000 drive device
1001 recording medium
1002 auxiliary storage device
1003 memory device
1004 CPU
1005 interface device
1006 display device
1007 input device

The invention claimed is:

1. A communication apparatus for use in a communication system including a call control apparatus and a key information distribution apparatus, the communication apparatus comprising:

processing circuitry configured to
establish a call connection for performing media communication between the communication apparatus and another communication apparatus by transmitting a call connection request to the call control apparatus; and
transmit and receive encrypted media packets by using a first type of common key, which is unique to each of the communication apparatuses, during a first portion of the media communication and a second type of common key, which is the same for each of the communication apparatuses, during a second portion of the media communication, the first type of common key being a common key generated by key exchange between the communication apparatuses such that the instant communication apparatus and the another communication apparatus each transmits their respective first type of common key to each other via the call control apparatus prior to the call connection being established,
wherein when the first portion of the media communication is performed between the instant communication apparatus and the another communication apparatus, the key information distribution apparatus provides common key generation information for generating the second type of common key to the instant communication apparatus and the another communication apparatus, and
wherein the processing circuitry generates the second type of common key by using the common key generation information received from the key information distribution apparatus, and after the second type of common key is generated, and after the key information distribution apparatus confirms that the another communication apparatus has also generated the second type of common key, switches the keys so as to transmit and receive an encrypted media packet by using the second type of common key for the second portion of the media communication.

2. The communication apparatus according to claim 1, wherein, in a case where updated common key generation information is received from the key information distribution apparatus, the processing circuitry generates an updated second type of common key by using the updated common key generation information, and the processing circuitry transmits and receives an encrypted media packet by using the updated second type of common key.

3. The communication apparatus according to claim 2, wherein, in a case where the updated common key generation information is not received from the key information distribution apparatus after the processing circuitry generates the second type of common key by using the common key generation information and a predetermined period of time elapses, the processing circuitry encrypts a media packet by using the current second type of common key or the first type of common key, the predetermined period of time being a time interval at which the common key generation information is updated.

4. The communication apparatus according to claim 1, wherein the processing circuitry transmits, to the call control apparatus, an inquiry message that includes a telephone number of said another communication apparatus, and executes a process for establishing the call connection in response to reception of reply information indicating that said another communication apparatus has a secret communication function.

5. The communication apparatus according to claim 1, wherein the processing circuitry encrypts a media packet received from a terminal that does not have the secret communication function so as to transmit the encrypted media packet to said another communication apparatus, and decrypts an encrypted media packet received from said another communication apparatus so as to transmit the decrypted media packet to the terminal that does not have the secret communication function.

6. A communication method performed by a communication apparatus for use in a communication system including a call control apparatus and a key information distribution apparatus, the method comprising:
establishing, by processing circuitry of the communication apparatus, a call connection for performing media communication between the communication apparatus and another communication apparatus by transmitting a call connection request to the call control apparatus; and
transmitting and receiving, by the processing circuitry, encrypted media packets by using a first type of common key, which is unique to each of the communication apparatuses, during a first portion of the media communication and a second type of common key, which is the same for each of the communication apparatuses, during a second portion of the media communication, the first type of common key being a common key generated by key exchange between the communication apparatuses such that the instant communication apparatus and the another communication apparatus each transmits their respective first type of common key to each other via the call control apparatus prior to the call connection being established, wherein when the first portion of the media communication is performed between the instant communication apparatus and the another communication apparatus, the key information distribution apparatus provides common key generation information for generating the second type of common key to the instant communication apparatus and the another communication apparatus, and
wherein the processing circuitry generates the second type of common key by using the common key generation information received from the key information distribution apparatus, and after the second type of common key is generated, and after the key information distribution apparatus confirms that the another communication apparatus has also generated the second type of common key, switches the keys so as to transmit and receive an encrypted media packet by using the second type of common key for the second portion of the media communication.

7. A non-transitory recording medium storing a program for causing a computer to function as a communication apparatus for use in a communication system including a call control apparatus and a key information distribution apparatus, the communication apparatus comprising:
processing circuitry configured to
establish a call connection for performing media communication between the communication apparatus and another communication apparatus by transmitting a call connection request to the call control apparatus; and
transmit and receive encrypted media packets by using a first type of common key, which is unique to each of the communication apparatuses, during a first portion of the media communication and a second type of common key, which is the same for each of the communication apparatuses, during a second portion of the media communication, the first type of common key being a common key generated by key exchange between the communication apparatuses such that the instant communication apparatus and the another communication apparatus each transmits their respective first type of common key to each other via the call control apparatus prior to the call connection being established,
wherein when the first portion of the media communication is performed between the instant communication apparatus and the another communication apparatus, the key information distribution apparatus provides common key generation information for generating the second type of common key to the instant communication apparatus and the another communication apparatus, and
wherein the processing circuitry generates the second type of common key by using the common key generation information received from the key information distribution apparatus, and after the second type of common key is generated, and after the key information distribution apparatus confirms that the another communication apparatus has also generated the second type of common key, switches the keys so as to transmit and receive an encrypted media packet by using the second type of common key for the second portion of the media communication.

* * * * *